United States Patent
Seo et al.

(10) Patent No.: US 10,782,827 B2
(45) Date of Patent: Sep. 22, 2020

(54) PROXIMITY SENSOR AND METHOD FOR SENSING PROXIMITY THEREOF

(71) Applicant: ABOV SEMICONDUCTOR CO., LTD., Chungcheongbuk-do (KR)

(72) Inventors: Young Jin Seo, Seoul (KR); Byoung Su Jeong, Seoul (KR); Seok Hyun Jee, Gyeonggi-do (KR); Yun Yeong Jang, Gyeongsangbuk-do (KR)

(73) Assignee: ABOV SEMICONDUCTOR CO., LTD., Chungcheongbuk-do (KR)

( * ) Notice: Subject to any disclaimer, the term of this patent is extended or adjusted under 35 U.S.C. 154(b) by 0 days.

(21) Appl. No.: 16/671,942

(22) Filed: Nov. 1, 2019

(65) Prior Publication Data

US 2020/0142533 A1 May 7, 2020

(30) Foreign Application Priority Data

Nov. 1, 2018 (KR) .................. 10-2018-0132824

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04106* (2013.01); *G06F 2203/04108* (2013.01)

(58) Field of Classification Search
CPC ........ G06F 3/041; G06F 3/0418; G06F 3/044; G06F 2203/04106; G06F 2203/04108; H03K 17/945; H03K 17/955; H03K 17/96
See application file for complete search history.

(56) References Cited

U.S. PATENT DOCUMENTS

| | | | |
|---|---|---|---|
| 7,920,134 B2 * | 4/2011 | Krah | G06F 3/044 178/18.06 |
| 8,169,413 B2 | 5/2012 | Jin et al. | |
| 8,775,103 B1 * | 7/2014 | Jayaraj | H03K 17/955 702/57 |
| 9,582,111 B2 | 2/2017 | Rouaissia et al. | |

(Continued)

FOREIGN PATENT DOCUMENTS

| | | |
|---|---|---|
| KR | 10-1012305 B1 | 2/2011 |
| KR | 10-2017-0068754 A | 6/2017 |

*Primary Examiner* — Sardis F Azongha
(74) *Attorney, Agent, or Firm* — Nelson Mullins Riley & Scarborough LLP; Kongsik Kim, Esq.

(57) ABSTRACT

Disclosed are a proximity sensor and a proximity detection method for the proximity sensor. The proximity sensor includes: a reception circuit configured to receive a first electrical signal which is generated based on proximity of the conductor; a first signal processing circuit configured to determine whether or not the conductor is in close proximity to the electronic device by using the first electrical signal, a first baseline value, and a threshold value; a temperature detection circuit configured to detect the temperature of the proximity sensor independently of the first electrical signal; and a second signal processing circuit configured to, when the conductor is in close proximity to the electronic device and also a temperature variation equal to or larger than a reference value is detected by the temperature detection circuit, generate a second baseline value by adding a temporary compensation value to the first baseline value.

10 Claims, 10 Drawing Sheets

(56) References Cited

U.S. PATENT DOCUMENTS

2008/0047764 A1    2/2008  Lee et al.
2012/0026123 A1*  2/2012  Grunthaner ............. G06F 3/044
                                                                        345/174
2017/0075482 A1*  3/2017  Imai ...................... G06F 3/0416

* cited by examiner

"Related Art"

"Related Art"

PROXIMITY SENSOR AND METHOD FOR SENSING PROXIMITY THEREOF

CROSS-REFERENCE TO RELATED APPLICATION

This application claims under 35 U.S.C. § 119(a) the benefit of Korean Patent Application No. 10-2018-0132824 filed on Nov. 1, 2018, which is incorporated herein by reference.

TECHNICAL FIELD

The present invention relates generally to a proximity sensor and a proximity detection method for the proximity sensor, and more specifically to a circuit and method which improve the accuracy of proximity detection by improving a scheme for compensating for a variation in temperature upon proximity detection.

BACKGROUND ART

With the development of information and communication technology, network devices, such as base stations, are installed in various places of a country, and electronic devices enable users to freely use networks anywhere in the country by transmitting and receiving data to and from other electronic devices over the networks.

Various types of electronic devices provide various functions in line with the recent trend of digital convergence. For example, smartphones support an Internet access function using a network, a music or video playback function and a still image or video photographing function using an image sensor, in addition to the function of making calls.

Users are carrying electronic devices which perform various functions. Accordingly, the problem of managing electromagnetic waves which may be generated in the electronic devices and are harmful to the human body has become a critical issue.

In particular, when a user makes a call by using a smartphone for a long time, the device is located proximate to the face of the user, and thus the user may be exposed to harmful electromagnetic waves. Accordingly, there is a related technology which detects whether or not the face of a user and a device are in close proximity to each other and then adjusts power causing electromagnetic waves.

In this related technology, a touch and proximity sensing technology is utilized. When a call is made for a long time, the results of the touch and proximity sensing of the device may be affected by a variation in temperature.

An example of the related technology is Korean Patent Application Publication No. 10-2017-0068754 entitled "Electronic Device and Method for Adjusting Transmission Power." FIG. 1 shows a problem which is recognized by the related technology, and FIG. 2 shows a solution which is proposed by the related technology in order to mitigate the situation of FIG. 1.

FIG. 1 is a view showing the GRIP sensing count value of a touch integrated circuit (touch IC) in which no compensation is made when temperature continues to increase according to the related technology. Referring to FIG. 1, when temperature continues to increase, capacitance-related counter value may also increase. As capacitance-related counter value increases, capacitive reactance decreases, and thus frequency increases. In this case, the GRIP sensing count value which is recognized as frequency by the touch IC increases further than in the case where there is no touch.

In order to overcome this problem, the related technology proposes a method of compensating the sensing count value of a touch IC when a user is in proximity (makes a grip) by using a reference channel, as shown in FIG. 2.

However, the related technology has a problem in that the accuracy of touch and proximity sensing is poor in the case where temperature increases due to a long-time call during a call, particularly in the state in which the face of a user and the device are in close proximity. Furthermore, an additional reference channel which is not actually involved in touch operation must be maintained, and thus a problem arises in that the area or power consumption of a touch IC increases. Furthermore, as a result, a problem arises in that a large quantity of electromagnetic waves harmful to a user are generated. Moreover, there is a possibility of erroneous operation in the case where there is a discrepancy between the variation in temperature experienced by the reference channel and the variation in temperature experienced by the main channel.

Meanwhile, as related technologies which periodically detect a variation in external temperature by using a temperature sensor in a touch sensor and compensate a recognition threshold for the recognition of a touch event in response to a variation in external temperature, Korean Patent No. 10-1012305 entitled "Method for Operating Touch Input Device and Portable Terminal Using The Same" and U.S. Pat. No. 8,169,413 entitled "Method for operating touch input device and portable terminal using the same" were proposed.

However, these related technologies still have a problem in that the accuracy of touch and proximity sensing is poor in the case where temperature increases due to a long-time call during a call, particularly in the state in which the face of a user and the device are in close proximity. Furthermore, there is a possibility of erroneous operation in the case where there is a discrepancy between the variation in temperature recognized by the temperature sensor and the variation in temperature experienced by the main channel which recognizes an actual touch operation.

SUMMARY OF THE DISCLOSURE

Korean Patent Application Publication No. 10-2017-0068754 entitled "Electronic Device and Method for Adjusting Transmission Power" discloses a technology in which in order to perform the temperature compensation of a touch IC containing a proximity sensor, a reference channel (REF) having resistances and capacitors equivalent to those of a GRIP channel mounted thereon is provided on a separate pin of the touch IC and the slopes of the sensing count values of the GRIP channel and the REF channel attributable to an increase in temperature are utilized.

In this related technology, in order to implement the reference channel on the additive pin of the touch IC, the pluralities of resistors and capacitors must be mounted as passive devices unrelated to the main function of a circuit, and thus the circuit is complicated and a large area for the mounting of components is required. Furthermore, a problem arises in that the loss of power consumed in the reference channel increases, and thus a large quantity of electromagnetic waves harmful to the human body is generated.

The present invention has been conceived to overcome the above-described problems of the related technology, and an object of the present invention is to reduce electromagnetic waves generated in a device when temperature increases due to a long-time call during a call, particularly in the state in which the face of a user and the device are in close proximity to each other.

An object of the present invention is to compensate for the temperature of a proximity sensor in order to prevent the accuracy of the operation of a device from being deteriorated when temperature increases.

An object of the present invention is to reduce the complexity and area of a circuit in order to reduce power consumption causing the generation of electromagnetic waves while compensating for the temperature of a proximity sensor.

The temperature compensation algorithms adopted by the related technologies utilize an additive temperature sensor or compensate the operation of a main channel by using a reference channel. There is also a possibility that the measured temperature value output by the additive temperature sensor is incorrect or there is a discrepancy between the variation in temperature experienced by the temperature sensor and the temperature variation experienced by the main channel. In the case of the reference channel, the reference channel is a channel separate from the main channel, and thus there may be a discrepancy between the variation in temperature experienced by the reference channel and the variation in temperature experienced by the main channel in actual operation. Another object of the present invention is to propose a temperature compensation method which can increase the accuracy of the temperature compensation algorithm of the related technology by reducing the inaccuracy thereof.

Furthermore, the temperature sensor includes an electronic circuit. The output value of the temperature sensor includes some nonlinearity. If a temperature sensor circuit is optimized for a specific temperature, e.g., room temperature (25 degrees Celsius), the measured temperature value of the temperature sensor circuit may be inaccurate in the case where the nonlinearity of the temperature sensor circuit is significant when temperature is increased by the operation of the electronic circuit. Another object of the present invention is to propose a temperature compensation method which can improve accuracy while taking into consideration the above-described inaccuracy and nonlinearity of the temperature sensor circuit.

In accordance with an aspect of the present invention, there is provided a proximity sensor including a reception circuit, a first signal processing circuit, a second signal processing circuit, and a temperature detection circuit. The reception circuit receives a first electrical signal which is generated based on the proximity of a conductor.

The first signal processing circuit determines whether or not the conductor is in close proximity to an electronic device by using the first electrical signal, a first baseline value, and a threshold value. The temperature detection circuit detects the temperature of the proximity sensor independently of the first electrical signal.

When the conductor is in close proximity to the electronic device and also a temperature variation equal to or larger than a reference value is detected by the temperature detection circuit, the second signal processing circuit generates a second baseline value by adding a temporary compensation value to the first baseline value.

The second signal processing circuit may provide the second baseline value to the first signal processing circuit, and the first signal processing circuit may select a baseline value, to be used to determine whether or not the conductor is in close proximity to the electronic device, based on the second baseline value and the first electrical signal.

When the second baseline value or a second threshold value based on the second baseline value is larger than the first electrical signal, the first signal processing circuit may determine whether or not the conductor is in close proximity to the electronic device by using the first baseline value.

When the second baseline value or a second threshold value based on the second baseline value is not larger than the first electrical signal, the first signal processing circuit may determine whether or not the conductor is in close proximity to the electronic device by using the second baseline value, and may update the first baseline value by using the second baseline value.

The first signal processing circuit may provide the selected baseline value, to be used to determine whether or not the conductor is in close proximity to the electronic device, to the second signal processing circuit, and the second signal processing circuit may update the first baseline value by using the provided baseline value.

In accordance with another aspect of the present invention, there is provided a proximity detection method for a proximity sensor for detecting proximity of a conductor to an electronic device, the proximity detection method including: receiving a first electrical signal which is generated based on the proximity of the conductor; detecting the temperature of the proximity sensor independently of the first electrical signal; determining whether or not the conductor is in close proximity to the electronic device by using the first electrical signal, a first baseline value, and a threshold value; and, when the conductor is in close proximity to the electronic device and also a temperature variation equal to or larger than a reference value is detected, generating a second baseline value by adding a temporary compensation value to the first baseline value.

The proximity detection method may further include, when the conductor is in close proximity to the electronic device and also a temperature variation equal to or larger than a reference value is detected, selecting a baseline value, to be used to determine whether or not the conductor is in close proximity to the electronic device, based on the second baseline value and the first electrical signal.

The selecting may include, when the second baseline value or a second threshold value based on the second baseline value is larger than the first electrical signal, selecting the first baseline value as the baseline value to be used to determine whether or not the conductor is in close proximity to the electronic device.

The selecting may include, when the second baseline value or a second threshold value based on the second baseline value is not larger than the first electrical signal, selecting the second baseline value as the baseline value to be used to determine whether or not the conductor is in close proximity to the electronic device.

The proximity detection method may further include updating the first baseline by using the selected baseline value to be used to determine whether or not the conductor is in close proximity to the electronic device.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

Embodiments of the present invention will be described in detail below with reference to the accompanying drawings. In the following description, when it is determined that a detailed description of a known component or function may unnecessarily make the gist of the present invention obscure, it will be omitted.

Figure 1:
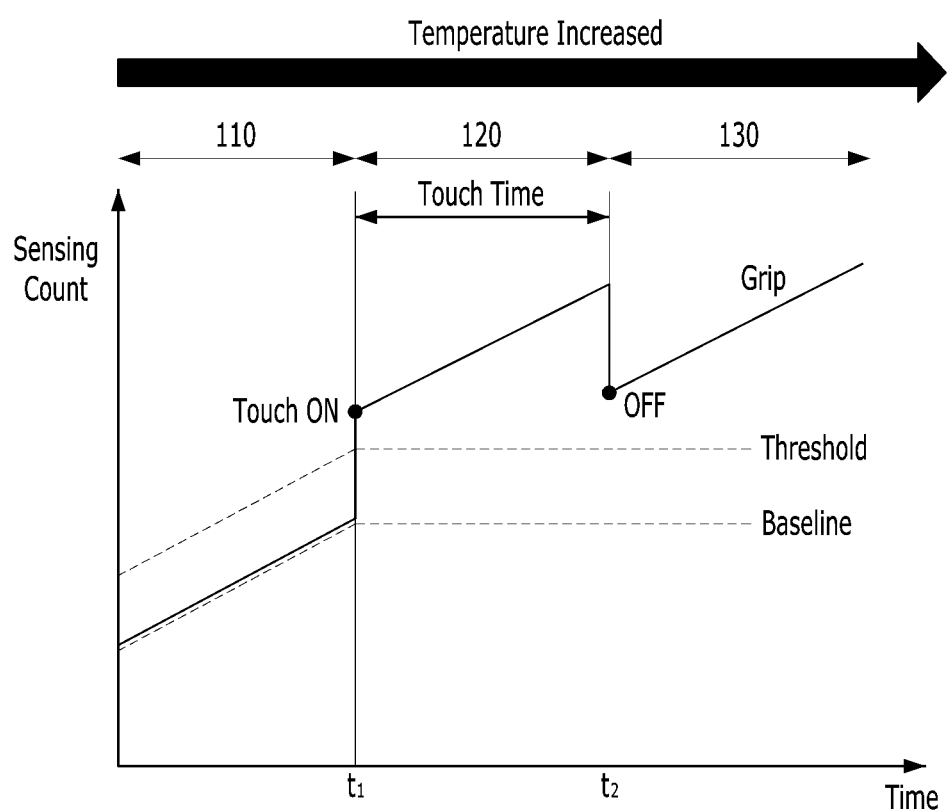
FIG. 1 is a view showing the GRIP sensing count value of a touch IC in which no compensation is made when temperature continues to increase according to the related technology.
Figure 2:
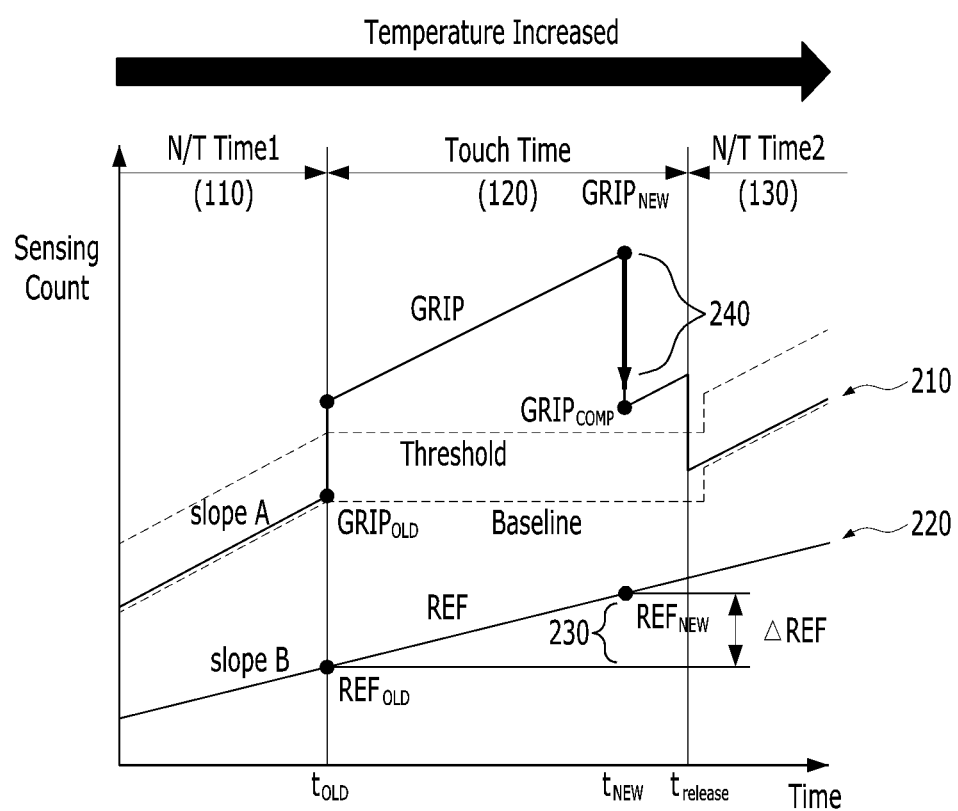
FIG. 2 is a view showing an operation of compensating the GRIP sensing count value of a touch IC when temperature continues to increase according to the related technology.

FIGS. 1 and 2 are views showing the related technology. FIGS. 1 and 2 show a problem to be solved by the present invention, and some of the solutions adopted by the present invention are also applied to FIGS. 1 and 2.

Some of the items shown in FIGS. 1 and 2 will be considered to be parts of the configuration of the present invention as long as they are also included to embody the present invention. The related technology of FIGS. 1 and 2 will be described to help only to understand the present invention below.

When a user presses or touches a screen with a finger, a pen, or the like on the touch panel of an electronic device such as a smartphone, a touch IC may detect capacitance accumulated at a corresponding location, and may transfer a touch detection signal to a main processor. In this case, the main processor may include an application processor and a communication processor. In other words, the touch IC may accumulate capacitance-related counter value for a preset time, and may determine whether or not a touch has been made depending on whether or not the accumulated capacitance-related counter value exceeds a threshold value.

In order to recognize a case where since a user is making a voice call while holding an electronic device, the electronic device is located proximate to the face of the user and thus the user may be exposed to harmful electromagnetic waves, the touch IC may detect whether or not the user has touched a metal member constituting the housing of the electronic device or a touch has been made by the close contact between the face of the user and a touch panel during a voice call.

Furthermore, when there has been a touch, the touch IC may transmit a touch detection signal to the main processor, and the main processor may turn off the backlight of a screen touch panel, reduce the intensity of Tx power, which is the transmission power of a communication circuit, or reduce the power consumption of other circuits. As a result, harmful electromagnetic waves generated in the electronic device may be reduced.

Meanwhile, when temperature continues to increase, capacitance-related counter value may also increase. As capacitance-related counter value increases, capacitive reactance decreases, and thus frequency increases. The skins of humans are conductors. When there is a touch of a finger or the skin of a human, the capacitance recognized by the touch IC increases, and thus capacitive reactance decreases. Accordingly, the GRIP sensing count value recognized as frequency by the touch IC increases compared to that in the case where there is no touch. In other words, the capacitance-related counter value refers to a GRIP sensing count value.

In other words, the GRIP sensing count value of the touch IC shown in FIG. 1 is accompanied by a phenomenon in which temperature increases over time. In this case, a phenomenon in which as temperature increases, capacitance increases and thus a GRIP sensing count value increases is shown in FIG. 1.

Referring to FIG. 1, although a first interval (from 0 to $t_1$) 110 is a case in which there is no touch on a metal member, temperature increases and a GRIP sensing count value also increases. In addition, the sensing count value of a baseline and a threshold value also increase. In this case, the sensing count value of the baseline may be set to the per-unit time average value of GRIP sensing count values. The threshold value is a reference value based on which whether or not a touch has been made is determined, and is a sensing count value which is set to a value which is larger than the sensing count value of the baseline by a preset size. The threshold value may be set to a value which is optimized by taking into consideration temperature, response speed, stability, and/or the like.

In a second interval (from $t_1$ to $t_2$; Touch Time) 120, a user holds an electronic device and brings the electronic device proximate to his or her face in order to make a voice call, and thus a touch of a finger or the skin of a part of his or her face is made on the metal member of the housing of the electronic device or touch panel of the electronic device (Touch ON). In this case, the touch IC recognizes a current case as a case in which the electronic device is located proximate to the face of the user and thus the user may be exposed to harmful electromagnetic waves, and transmits a touch detection signal to the main processor. Accordingly, the main processor may turn off the backlight of the screen touch panel, may reduce the intensity of Tx power, which is the transmission power of the communication circuit, or may reduce the power consumption of other circuits. As a result, harmful electromagnetic waves generated in the electronic device may be reduced.

Accordingly, the GRIP sensing count value is increased to a value larger than the threshold value, and thus the touch IC may recognize a current state as a touch state. Based on this, the sensing count value of the baseline becomes a fixed value. The reason for this is that the sensing count value of the baseline and the threshold value track the GRIP sensing count value when a touch does not occur but do not track the GRIP sensing count value when a touch occurs. Therefore, the threshold value also becomes a fixed value.

However, in the second interval (Touch Time) 120, temperature also continues to increase over time. It can be seen that the GRIP sensing count value continues to increase while the sensing count value of the baseline is fixed, and thus the difference between both the values increases gradually.

Furthermore, it is assumed that the touch is released at $t_2$ (Touch OFF). It can be seen that the GRIP sensing count value decreases by the increase at t1 based on the release of the touch at $t_2$ but the GRIP sensing count value continues to increase in the second interval 120, and thus the GRIP sensing count value is larger than the threshold value at $t_2$.

Accordingly, in a third interval (after $t_2$), the touch IC 130 determines that a current state is a state in which the touch is not released despite the fact that the touch has been released (a state in which the user has placed the electronic device away from his or her face after finishing the call), and does not transmit a touch release signal to the main processor. The main processor which limited the backlight power of the display, the transmission power (Tx power) of the communication circuit, and the power consumption of other circuits in response to the touch detection signal does not recover the limited power despite the state in which the touch has been released. Accordingly, the communication yield rate or important function of the electronic device may be deteriorated.

FIG. 2 is a view showing an operation of compensating the GRIP sensing count value 210 of a touch IC when temperature continues to increase according to the related technology.

Referring to FIG. 2, in a first non-touch time (N/T time1) 110 (from 0 to $t_{OLD}$), the touch IC may measure slope A of GRIP sensing count values 210 and slope B of sensing count values (REF) 220 for a reference channel.

As shown in FIG. 2, it can be seen that a touch occurs at $t_{OLD}$ the sensing count value of a baseline is fixed to $GRIP_{OLD}$, and the GRIP sensing count value 210 continues to increase due to an increase in temperature.

In this case, the increase in the GRIP sensing count value attributable to the touch operation at $t_{OLD}$ is an intended increase, and the increase in the GRIP sensing count value attributable to the increases in the temperature is an unintended increase. Accordingly, it is necessary to compensate for the increase in the GRIP sensing count value attributable to the increases in the temperature.

The touch IC may compensate for the increase in the GRIP sensing count value attributable to the increase in the temperature at $t_{NEW}$. For example, the touch IC measures a variation (REF) 230 in the sensing count value 220 for the reference channel REF in an interval from $t_{OLD}$ to $t_{NEW}$. Furthermore, the touch IC multiplies the variation 230 by the ratio of slope A to slope B. In other words, the touch IC may calculate a compensation value 240 by multiplying the variation 230 by slope A/slope B.

Accordingly, the GRIP sensing count value 210 may be decreased by the compensation value 240 at $t_{NEW}$. When the touch is released at $t_{release}$ the GRIP sensing count value 210 becomes smaller than the threshold value, and thus the touch IC becomes aware that the touch has been released. As a result, the touch IC recognizes a current state as a state in which the user has placed the electronic device away from his or her face after finishing the call, and may transmit a touch release signal to the main processor.

Accordingly, the main processor may recover the backlight power of the display, the transmission power (Tx power) of the communication circuit, and the limited power of the other circuits limited in the touch interval (Touch Time) 120 from $t_{OLD}$ to $t_{release}$ thereby restoring the communication yield rate or important function of the electronic device.

According to the related technology, whether or not a current state is a touch state is detected by comparing a value, obtained by subtracting the compensation value 240 from the GRIP sensing count value 210, with the threshold value in the touch interval 120 of FIGS. 1 and 2. In this process, the compensation value 240 may be determined based on the variation 230 which appears in a separate reference channel. This related technology is directed to a method of compensating the GRIP sensing count value 210 attributable to an increase in temperature by using the reference channel 220.

The reference channel of FIG. 2 has the problem of increasing manufacturing cost because it is composed of an additive circuit and occupies an area in practice. Furthermore, the reference channel is actually a channel separate from a main channel involved in a touch operation, and thus the compensation algorithm of FIG. 2 has a possibility of error when a variation in an environment, such as temperature, experienced by the reference channel is different from that experienced by the main channel. Furthermore, in the case where a temperature sensor is used to supplement the related technology proposed in FIG. 2, there is a possibility of error when a variation in temperature experienced by the temperature sensor is not consistent with a variation in temperature experienced by the main channel. Accordingly, the present invention is embodied to include a method of complementing a temperature measurement result which is presented by a temperature sensor.

In practice, there are various thermal sources in electronic devices. Accordingly, there is a possibility that temperature itself increases nonlinearly, and there is also a possibility that a temperature sensor circuit outputs a nonlinear temperature measurement result different from an actual variation in temperature.

As described above, the present invention is proposed to overcome the problem shown in FIG. 1 and to further reduce the possibility of error of the related technology proposed in FIG. 2. A proximity sensor and a proximity detection method for the proximity sensor according to an embodiment of the present invention will be described below.

Figure 3:
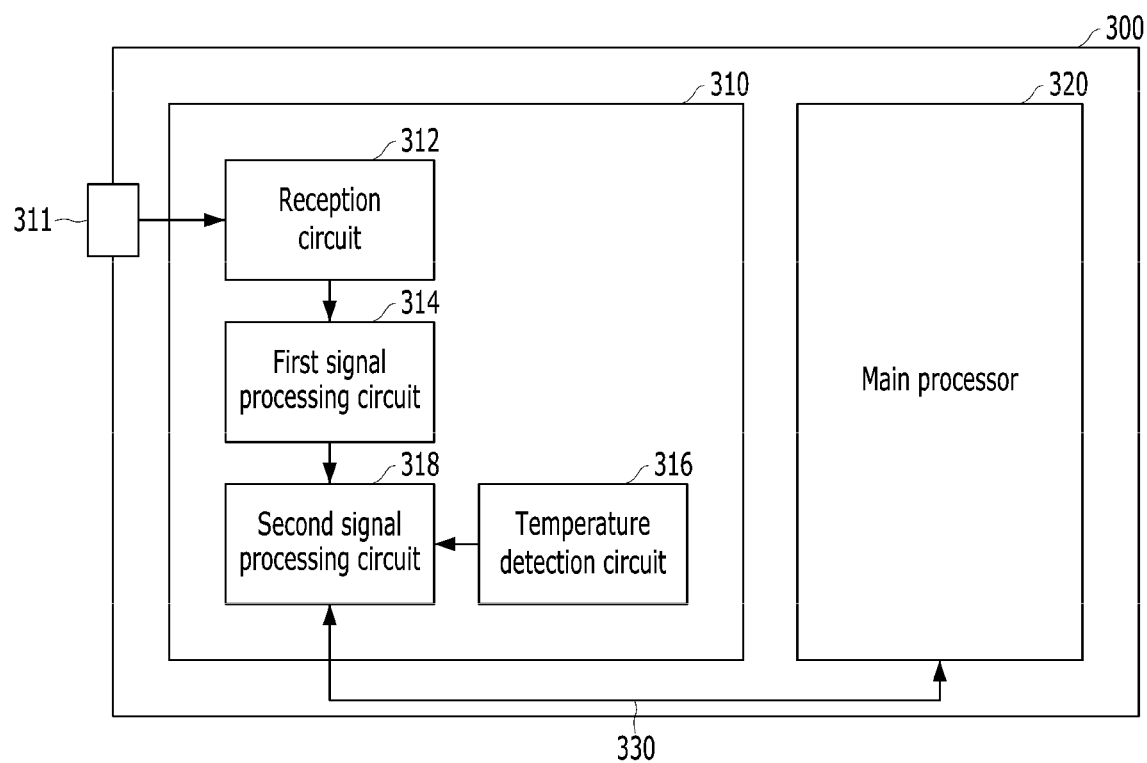
FIG. 3 is a block diagram showing an electronic device including a proximity sensor according to an embodiment of the present invention.

FIG. 3 is a block diagram showing an electronic device 300 including a proximity sensor 310 according to an embodiment of the present invention.

Referring to FIG. 3, the electronic device 300 including the proximity sensor 310 according to the present embodiment may further include a touch tab 311, a main processor 320, and an I2C communication path 330. In this case, the proximity sensor 310 may include a reception circuit 312, a first signal processing circuit 314, a second signal processing circuit 318, and a temperature detection circuit 316.

In this case, the proximity sensor 310 may include a grip sensor, and a specific absorption rate proximity sensor. When the proximity sensor 310 is contained in a touch IC in the form of a single chip, a circuit may be implemented to be simpler than that in the case where the proximity sensor 310 is implemented as a separate chip, and thus the size of a part mounting area may be reduced and power consumption may be reduced.

In this case, the proximity sensor 310 may detect accumulated capacitance-related counter value via the touch tab 311 when a user touches the metal member of the housing of the electronic device 300 with a finger in order to hold the electronic device 300 or when a user touches a touch panel. When a conductor, such as the skin of a human, comes into contact with the metal member of the housing of the electronic device 300 or touch panel, capacitance is varied by a touch. The proximity sensor 310 may determine whether or not a touch has occurred based on whether or not a variation in capacitance (or capacitance-related counter value) is equal to or larger than a preset threshold value.

Meanwhile, the proximity sensor 310 may be installed in the touch IC along with firmware. When the touch IC is implemented as a microcontroller unit, it may be possible to modify software regarding the proximity sensor 310 or improve an algorithm regarding the proximity sensor 310.

When the proximity sensor 310 detects the fact that the user holds the electronic device 300 and touches the metal member of the housing with his or her finger or the fact that the user brings the electronic device 300 into close contact with his or her head to make a voice call and the skin of his or her face comes into contact with the screen touch panel, it may transmit a touch detection signal to the main processor 320 over the I2C communication path 330. The main processor 320 which has received the touch detection signal may turn off the backlight of the screen touch panel, reduce the intensity of Tx power, which is the transmission power of the communication circuit, and reduce the power consumption of other circuits, thereby reducing the generation of electromagnetic waves harmful to the user.

The touch tab 311 may detect an electrical signal which is generated when the user touches the metal member of the housing of the electronic device 300 with his or her finger in order to hold the electronic device 300, when the user touches the touch panel, or when the face of the user touches the touch panel because the user brings the electronic device 300 into close contact with his or her head in order to make a voice call.

In this case, the electrical signal may be capacitance-related value, or may be frequency attributable to capacitive reactance. Meanwhile, frequency attributable to measured capacitive reactance may be defined as a GRIP sensing count value.

When temperature continues to increase, capacitance-related value may also increase. As capacitance increases, capacitive reactance decreases, and thus frequency increases. The skins of humans are conductors. Therefore, the GRIP sensing count value also increases. When a touch occurs between the skin of the user and the touch tab 311, capacitance increases, and thus capacitive reactance decreases and frequency increases. Therefore, a measured GRIP sensing count value increases.

The touch tab 311 may be electrically connected to the proximity sensor 310 over a plurality of channels, and may include a plurality of touch tabs. Some of the touch tabs 311 may be electrically connected to the metal member of the housing of the electronic device 300, and some of the touch tabs 311 may be electrically connected to the touch panel of the electronic device 300.

The reception circuit 312 may receive an electrical signal generated in the touch tab 311. In this case, the electrical signal may be a capacitance-related value or a GRIP sensing count value, as described above. The touch tab 311 and the reception circuit 312 form a main channel for the recognition of the touch operation of the present invention.

The first signal processing circuit 314 may receive an electrical signal from the reception circuit 312, and may determine whether a touch has occurred by using a threshold value. In other words, the first signal processing circuit 314 may determine whether or not a touch has been made based on whether or not a received capacitance-related value or GRIP sensing count value exceeds the threshold value.

In this case, the threshold value is a reference value based on which whether or not a touch has been made is determined, and is a sensing count value which is set to a value which is larger than the sensing count value of the baseline by a preset size. The sensing count value of the baseline may be set to the per-unit time average value of GRIP sensing count values. The threshold value may be set to a value which is optimized by taking into consideration temperature, response speed, stability, and/or the like.

As the temperature increases, the capacitance-related value increases, and thus the GRIP sensing count value also increases at a predetermined rate. Meanwhile, the sensing count value of the baseline and the threshold value track the GRIP sensing count value when a touch does not occur, but do not track the GRIP sensing count value when a touch occurs.

The temperature detection circuit 316 may detect the temperature of the proximity sensor 310 separately and independently of an electrical signal received by the reception circuit 312 of the main channel. The reason for this is to detect the temperature of the proximity sensor 310 itself independently of an electrical signal received by the reception circuit 312 because when the temperature continues to increase, the electrical signal may also increase.

In the case where the first signal processing circuit 314 determines that a touch has occurred, the second signal processing circuit 318 may generate the sensing count value of a temporary baseline obtained by adding a temporary compensation value to the sensing count value of the current baseline when the temperature detection circuit 316 detects a variation in temperature which is larger than a reference value based on the temperature at the time when the touch occurred. In other words, when the first signal processing circuit 314 determines that a touch has occurred, the GRIP sensing count value increases above the threshold value, and the sensing count value of the current baseline is fixed based on this. Furthermore, the current threshold value is also fixed. The reason for this is that the sensing count value of the baseline and the threshold value track the GRIP sensing count value when a touch does not occur but do not track the GRIP sensing count value when a touch occurs, as described above. Meanwhile, the second signal processing circuit 318 may be a circuit included in the proximity sensor 310, or may be implemented as the firmware of the touch IC or as software in the main processor 320.

The main processor 320 may be implemented as, e.g., a system on chip (SoC), and may include one or more of a central processing unit (CPU), a graphics processing unit (GPU), an image signal processor, an application processor (AP), and a communication processor (CP). The main processor 320 may load a command or data received from at least one of other components (e.g., the touch panel, the touch IC, and the communication circuit) from memory, may process the command or data, and may store various data in the memory. When a touch has occurred, the main processor 320 may receive a touch detection signal as a touch interrupt signal from the second signal processing circuit 318 through the I2C communication path 330.

When the main processor 320 receives the touch detection signal, it may turn off the backlight of the screen touch panel, may reduce the intensity of Tx power, which is the transmission power of the communication circuit, or may reduce the power consumption of other circuits, thereby reducing the generation of harmful electromagnetic waves generated in the electronic device 300 proximate to the head of the user during a call.

Furthermore, the main processor 320 may distinguish a screen On state and a screen Off state from each other, and may change a period at which a touch is detected in order to improve the current consumption of the proximity sensor 310 itself. For example, in the screen On state, the period at which a touch is detected may be made shorter because the probability that there is a touch input is high, and in the screen Off state, the period at which a touch is detected may be made longer because the probability that there is a touch input is low.

Depending on an embodiment, the second signal processing circuit 318 may not be clearly distinguished from the first signal processing circuit 314. However, the second signal processing circuit 318 is distinguished from the first signal processing circuit 314 for convenience of description according to their functions implemented in hardware/software. The first signal processing circuit 314 and the second signal processing circuit 318 may be included in a single IC. The first signal processing circuit 314 and the second signal processing circuit 318 may be disposed in one region even in a single IC, or may be disposed in separate regions according to their functions. There may also be taken into consideration an arrangement in which the second signal processing circuit 318 is disposed proximate to the temperature detection circuit 316 to improve the accuracy of the detection of temperature.

Figure 4:
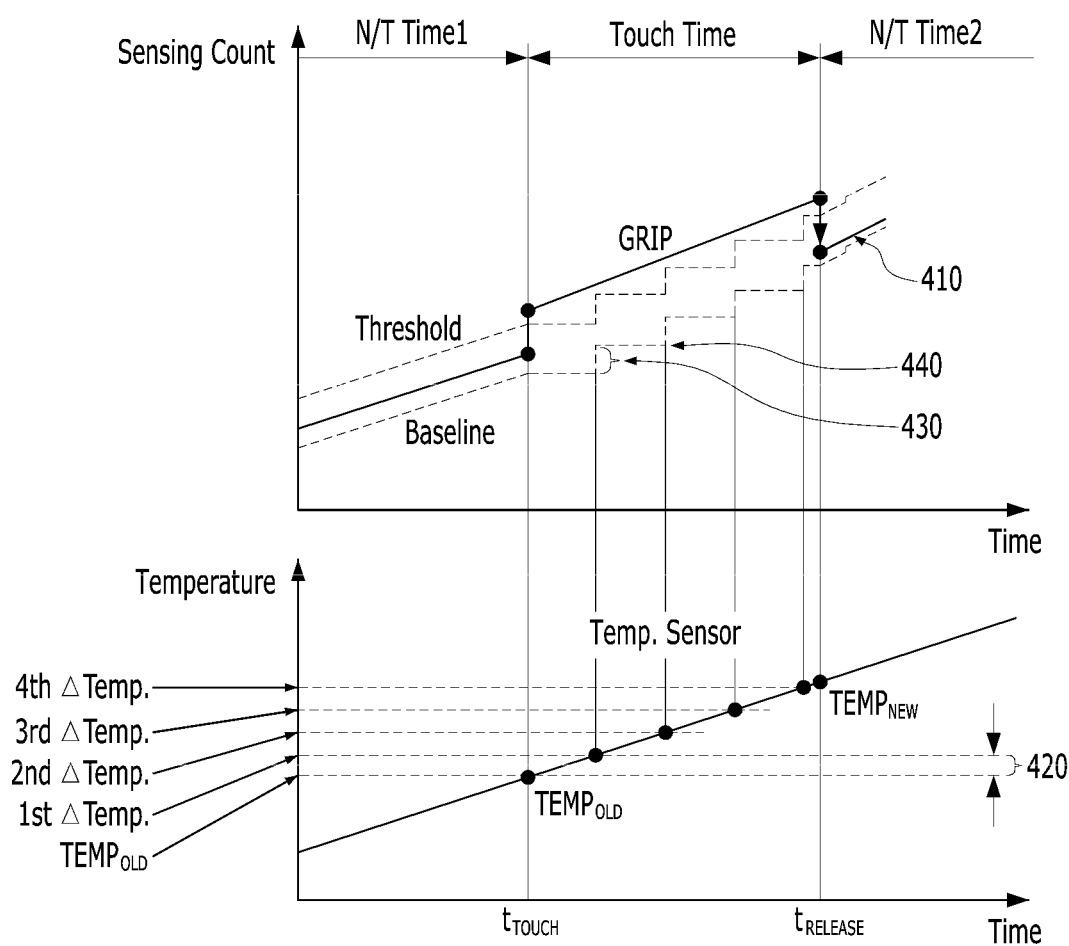
FIG. 4 is a view showing an operation of compensating the sensing count value of the baseline of a proximity sensor when temperature continues to increase according to an embodiment of the present invention.

FIG. 4 is a view showing an operation of compensating the sensing count value of the baseline of the proximity sensor 310 when temperature continues to increase according to an embodiment of the present invention.

Referring to FIG. 4, when a touch occurs at $t_{TOUCH}$ a temperature value $TEMP_{OLD}$ at the time when the touch occurs is stored. Thereafter, the temperature value $TEMP_{OLD}$ at the time when the touch occurred and a current temperature value are compared with each other.

When the difference between the current temperature value and the temperature value $TEMP_{OLD}$ at the time when the touch occurred becomes a multiple of a reference temperature variation TEMP 420, the sensing count value of the temporary baseline obtained by adding a temporary compensation value (Sensing Count) 430 to the sensing count value of the current baseline is generated as the sensing count value 440 of a new baseline.

In this manner, the sensing count value of a new baseline may be generated whenever a multiple of the reference temperature variation TEMP 420 is obtained until $t_{RELEASE}$ at which the touch is released. Accordingly, in the case where the GRIP sensing count value increases because temperature increases in the touch state, the proximity sensor 310 appropriately recognizes that the touch is released when the touch is released even when the sensing count value of the baseline does not track the GRIP sensing count value.

As described above, the present invention does not require a reference channel for the compensation of the GRIP sensing count value for temperature, and does not require resistors and capacitors constituting the reference channel, and thus a circuit is not complicated and an area may be reduced. Therefore, the generation of electromagnetic waves may be reduced by reducing power consumption, and manufacturing cost may be reduced.

Meanwhile, when the temperature decreases, the capacitance decreases, and thus the GRIP sensing count value decreases. Accordingly, when the temperature value $TEMP_{OLD}$ at the time when the touch occurred and the current temperature value are compared with each other and a decreased amount of the current temperature value is detected as a multiple of the reference temperature variation TEMP, the sensing count value of the temporary baseline is obtained by subtracting a temporary compensation value (Sensing Count) from the sensing count value of the current baseline. The sensing count value obtained in the way described above is generated as the sensing count value of a new baseline.

Figure 5:
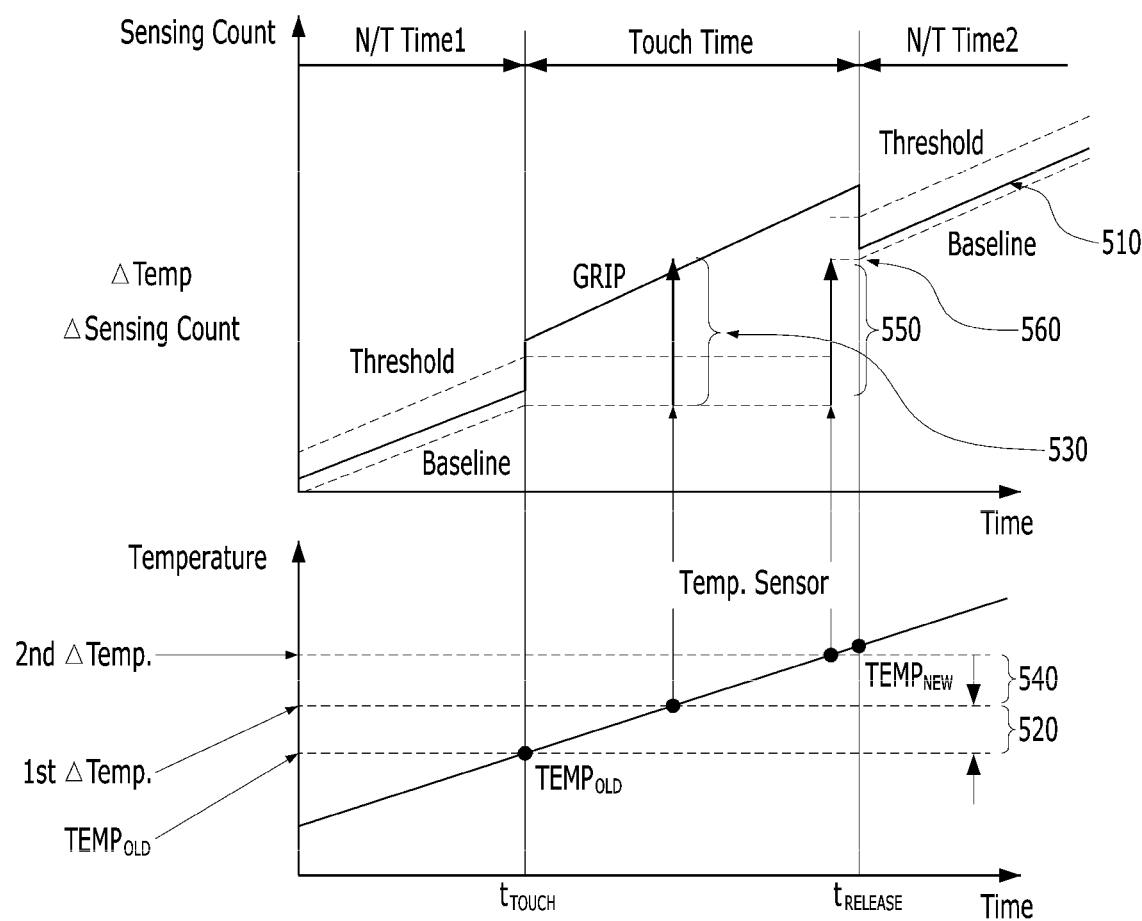
FIG. 5 is a view showing an operation of compensating the sensing count value of the baseline of a proximity sensor when temperature continues to increase according to an embodiment of the present invention.

FIG. 5 is a view showing an operation of compensating the sensing count value of the baseline of the proximity sensor 310 when temperature continues to increase according to an embodiment of the present invention.

In general, in FIG. 5, when temperature increases over time, a GRIP sensing count value 510 is shown as linearly increasing. In practice, there are many cases where the GRIP sensing count value 510 based on the temperature increases nonlinearly. There may be present various variation forms based on various factors.

Furthermore, even when the temperature detection circuit 316 and the proximity sensor 310 are contained in the touch IC and disposed in a single chip, the temperature value of the proximity sensor 310 measured by the temperature detection circuit 316 may not be consistent with an actual temperature which affects the GRIP sensing count value of the proximity sensor 310.

Accordingly, there may occur an exceptional phenomenon in which the temperature value measured by the temperature detection circuit 316 abnormally affects the GRIP sensing count value 510. In other words, in the case of using the temperature value of the proximity sensor 310 measured by the temperature detection circuit 316, the influence exerted on the GRIP sensing count value of the proximity sensor 310 by the measured temperature may not be consistent with by the influence exerted on the GRIP sensing count value of the proximity sensor 310 by the actual temperature value.

Therefore, since it is necessary to reduce the influence of the phenomenon on the operation of the proximity sensor 310, an adaptive compensation process, such as that shown in FIG. 5, is required.

Referring to FIG. 5, when a touch occurs at $t_{TOUCH}$ a temperature value $TEMP_{OLD}$ at the time when the touch occurs is stored. Thereafter, the temperature value $TEMP_{OLD}$ at the time when the touch occurred and a current temperature value are compared with each other. Whenever the difference between the current temperature value and the temperature value $TEMP_{OLD}$ at the time when the touch occurred becomes a multiple of a reference temperature variation TEMP 520, the sensing count value of the temporary baseline is generated by adding a temporary compensation value (Sensing Count) 530 to the sensing count value of the current baseline.

In this case, the temporary compensation value (Sensing Count) 530 may be designed to be a value optimized at room temperature (generally, 20±5° C.) Meanwhile, when the temperature increases and reaches a temperature (e.g., 85° C. or higher) higher than room temperature, the influence exerted on the proximity sensor 310 by an increase in temperature may increase or decrease nonlinearly. In other words, although the output value of the temperature sensor is output in proportion to an actual variation in temperature at room temperature, there is a possibility that the output value of the temperature sensor may be output differently from the actual variation in temperature at high temperature. This may also be the case when the temperature decreases and reaches a temperature lower than room temperature. The present invention proposes a method of compensating for even the error of a temperature measurement value caused by the nonlinear operation of the temperature sensor circuit.

When the influence exerted on the proximity sensor 310 by an increase in temperature at high temperature decreases nonlinearly, the GRIP sensing count value 510 in the touch state may be smaller than the sensing count value of the temporary baseline based on the temporary compensation value 530 which is added to the sensing count value of the current baseline based on the reference temperature variation TEMP 520.

In other words, when the difference between the current temperature value and the temperature value $TEMP_{OLD}$ at the time when the touch occurred is a first reference temperature variation (1st Temp.) 520, the sensing count value of the temporary baseline based on the temporary compensation value 530 added to the sensing count value of the current baseline is exceeded. In this case, since the GRIP sensing count value 510 is smaller than the temporary threshold value based on the sensing count value of the temporary baseline, there may occur an erroneous operation of erroneously recognizing a current state as not a touch state even in a touch state.

Therefore, in this case, in order to provide an appropriate operation, the addition of the temporary compensation value 530 to the sensing count value of the current baseline, which is the sensing count value of the baseline fixed at the time $t_{TOUCH}$ at which the touch occurred, is canceled.

However, when the difference between the current temperature value and the temperature value $TEMP_{OLD}$ at the time when the touch occurred reaches a second reference temperature variation (2nd Temp.) 540, the sensing count value of the temporary baseline 560 based on a temporary compensation value 550 added to the sensing count value of the current baseline does not exceed the GRIP sensing count value 510, and the GRIP sensing count value 510 exceeds the temporary threshold value based on the sensing count value of the temporary baseline 560. Accordingly, a touch state may be appropriately recognized. Therefore, unlike the temporary compensation value 530 the addition of which is canceled, the temporary compensation value 550 may be added to the sensing count value of the current baseline to thus generate the sensing count value 560 of the new baseline.

In other words, if the compensation of the sensing count value of the current baseline based on the temporary compensation value 530 is performed without an adaptive adjustment process because the first temporary compensation value 530 is an excessively large value, a current state is erroneously recognized as not a touch state even in a touch state and thus an erroneous operation occurs. Accordingly, the addition of the first temporary compensation value 530 to the sensing count value of the current baseline is canceled.

In contrast, the second temporary compensation value 550 is determined as an appropriate compensation value being checked by an adaptive adjustment process, and thus a touch state may be appropriately recognized, and a case where a touch is released may be appropriately recognized at $t_{RELEASE}$ as not a touch state.

As described above, even when the proximity sensor 310 operates in a nonlinear temperature variation state, accuracy may be improved and erroneous operations may be reduced by the adaptive compensation process of the present invention.

Figure 6:
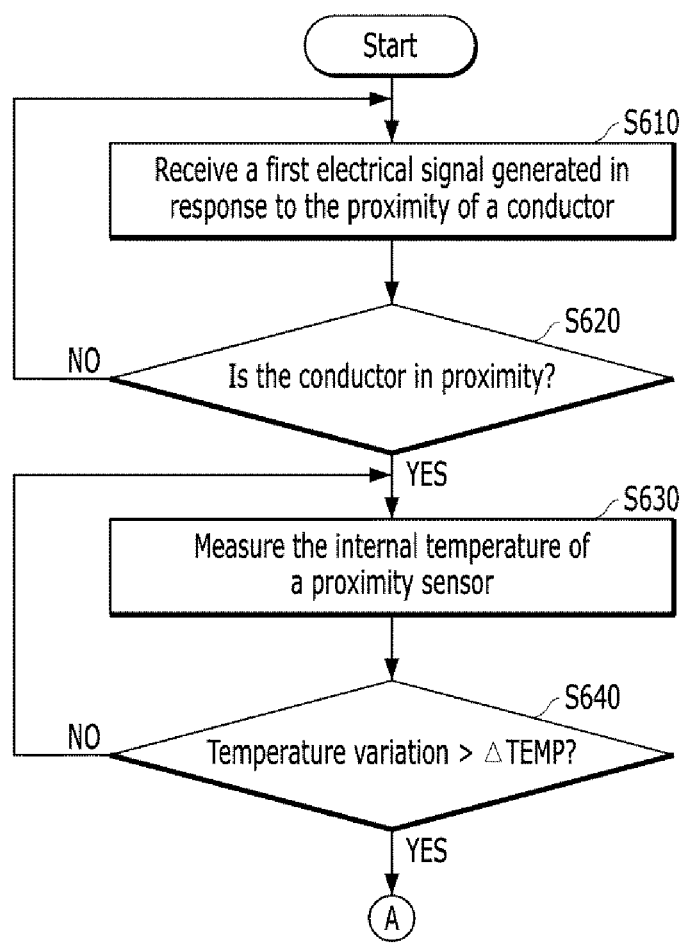
FIG. 6 is an operational flowchart showing a part of the proximity detection method for a proximity sensor according to an embodiment of the present invention.

FIG. 6 is an operational flowchart showing a part of the proximity detection method for the proximity sensor 310 according to an embodiment of the present invention.

Referring to FIG. 6, the reception circuit 312 receives a GRIP sensing count value generated as a touch of a user occurs at step S610. Meanwhile, the temperature detection circuit 316 may detect the current temperature value of the proximity sensor 310 independently of the GRIP sensing count value.

When the touch of the user occurs, the first signal processing circuit 314 determines whether or not a current state is a touch state by using a preset threshold value from the sensing count value of a current baseline based on the sensing count value of the current baseline at step S620. In other words, when the GRIP sensing count value increases above the threshold value, a current state may be recognized as a touch state.

When the first signal processing circuit 314 determines that the current state is a touch state, the temperature detection circuit 316 measures the internal temperature of the proximity sensor 310 over time based on the temperature of the proximity sensor 310 at the time when the touch occurred at step S630.

When the first signal processing circuit 314 determines that the current state is a touch state, the second signal processing circuit 318 determines whether or not there is a reference temperature variation ΔTEMP via the temperature detection circuit 316 at step S640.

Figure 7:
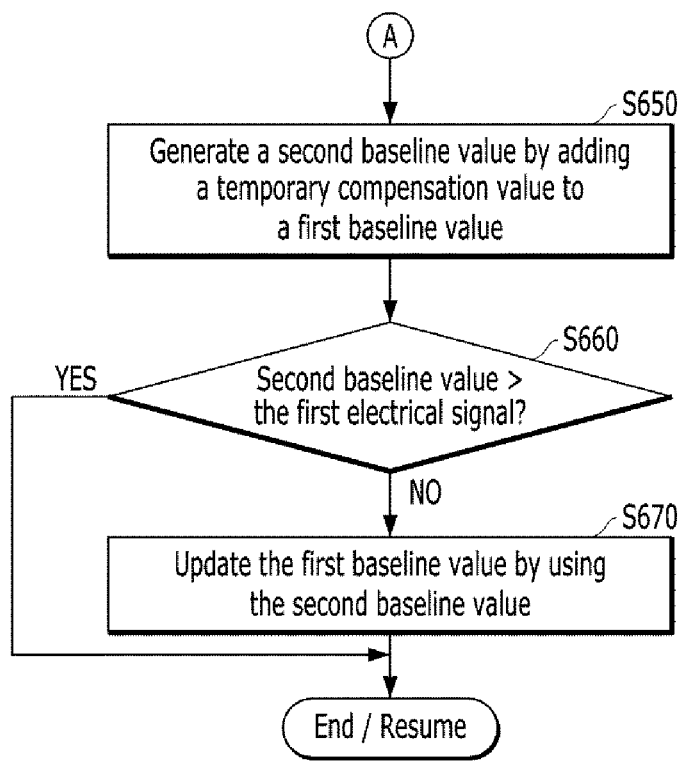
FIG. 7 is an operational flowchart showing the remaining part of the proximity detection method for a proximity sensor according to the embodiment of the present invention.

FIG. 7 is an operational flowchart showing the remaining part of the proximity detection method for the proximity sensor 310 according to the embodiment of the present invention.

Referring to FIG. 7, in the touch state, when the second signal processing circuit 318 determines that there is a reference temperature variation ΔTEMP via the temperature detection circuit 316, the sensing count value of the temporary baseline may be generated by adding the temporary compensation value to the sensing count value of the current baseline at step S650.

The first signal processing circuit 314 may be provided with the sensing count value of the temporary baseline generated by the second signal processing circuit 318, and may select the sensing count value of the baseline which will be used to determine whether a current state is a touch state based on the current GRIP sensing count value. In other words, the first signal processing circuit 314 compares the sensing count value of the temporary baseline and the current GRIP sensing count value with each other at step S660.

When the sensing count value of the temporary baseline is not larger than the current GRIP sensing count value, the first signal processing circuit 314 may update the sensing count value of the temporary baseline to the sensing count value of a new baseline, and may determine whether or not a current state is a touch state by determining whether or not the current GRIP sensing count value exceeds the threshold value of the new baseline by using the sensing count value of the new baseline at step S670.

When the sensing count value of the temporary baseline is larger than the current GRIP sensing count value, the first signal processing circuit 314 may cancel the addition of the temporary compensation value to the sensing count value of the current baseline and may determine whether or not a current state is a touch state by determining whether or not the current GRIP sensing count value exceeds the threshold value of the current baseline based on the sensing count value of the current baseline.

Figure 8:
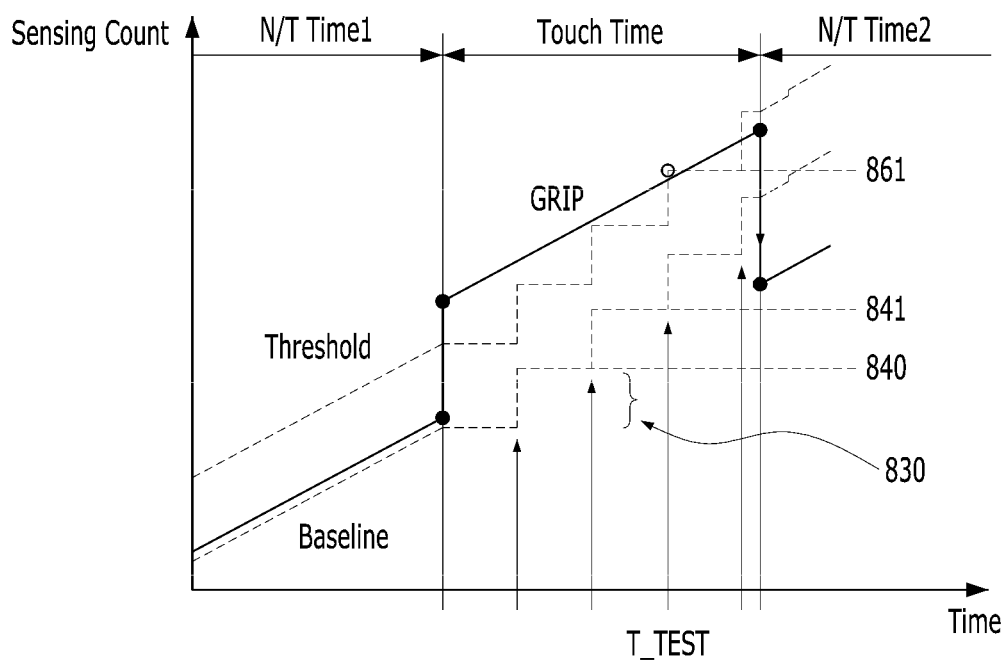
FIG. 8 is a view illustrating a case where an erroneous operation associated with the recognition of a grip/touch occurs in the related technology as a comparative example for the present invention.

FIG. 8 is a view illustrating a case where an erroneous operation associated with the recognition of a grip/touch occurs in the related technology as a comparative example for the present invention.

Referring to FIG. 8, it is assumed that interval Touch Time is a time interval for which a grip/touch is actually generated and maintained.

At T_TEST on time axis, a second baseline value 841, which is a temporary baseline value, is generated by adding a temporary compensation value 830 to a first baseline value 840, which is a current baseline value. Thereafter, a second threshold value 861, which is a temporary threshold value, may be generated based on the second baseline value 841.

At T_TEST of FIG. 8, the second threshold value 861 exceeds the GRIP sensing count value, and it is recognized that the touch has been released at T_TEST in the related technology. Since interval Touch Time is a time interval in which a touch is actually generated and maintained, an operation in which it is recognized that the touch has been released at T_TEST is apparently an erroneous operation.

An example of the cause of the erroneous operation in FIG. 8 is that the temporary compensation value 830, which is the count compensation value of the sensor for the predetermined temperature increase variation TEMP of the temperature sensor, is not optimized upon design and in actual operation and thus an error occurs. In practice, although the temperature sensor and its compensation circuit are optimized, it is almost impossible to completely eliminate an error when the process error of a chip and the variables of an environment to which the sensor is actually exposed are taken into consideration. Referring to an example of FIG. 8, even in the case where errors are minimized, if the minute errors of the temporary compensation value 830 are accumulated for a long time, it may become a cause of the generation of the erroneous operation of a touch.

In FIG. 8, the touch includes not only a touch on the touch screen but also a touch generated when a user holds a terminal during a call. Accordingly, when a grip/touch on a terminal is maintained due to making a call for a long time, watching a video for a long time, playing a game for a long time, or the like, the error of the temporary compensation value 830 is accumulated, and thus a possibility that an erroneous operation associated with the recognition of a grip/touch occurs is increased.

Figure 9:
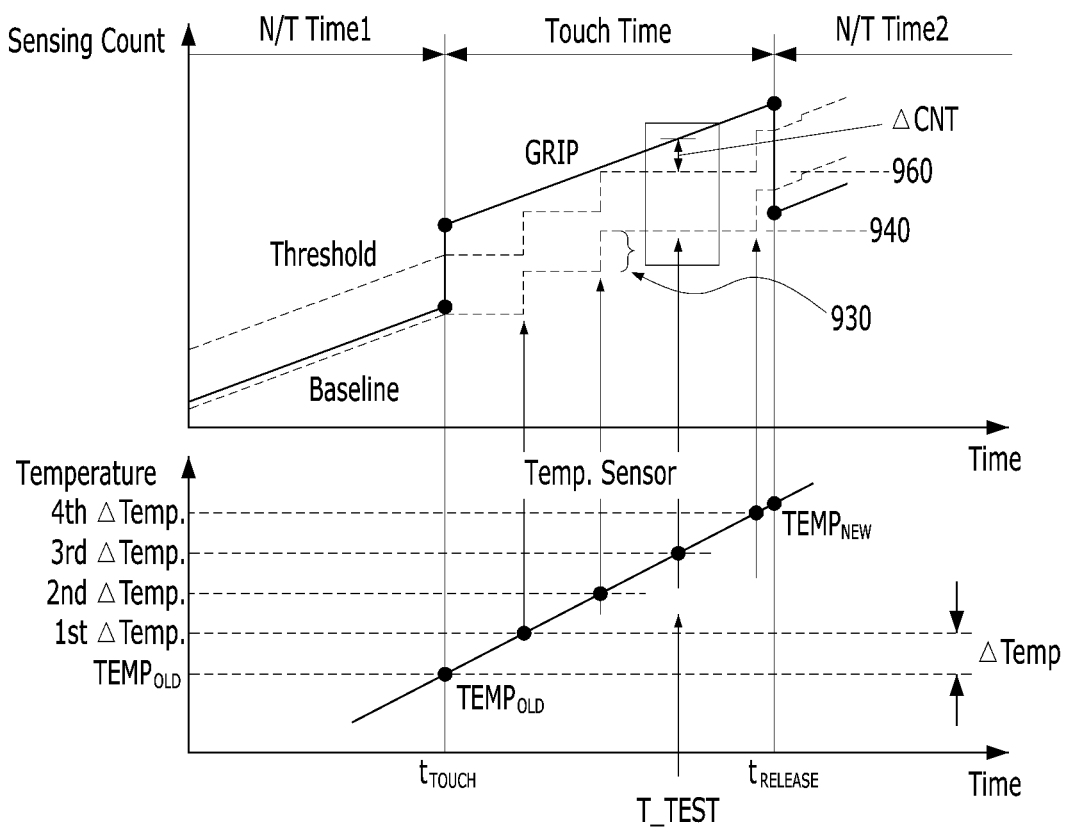
FIG. 9 is a view showing an operation of compensating the sensing count value of the baseline of a proximity sensor according to an embodiment of the present invention.

FIG. 9 is a view showing an operation of compensating the sensing count value of the baseline of a proximity sensor according to an embodiment of the present invention.

Referring to FIG. 9, it is assumed that interval Touch Time is a time interval for which a grip/touch is actually generated and maintained.

When a temporary compensation value 930 is added to a first baseline value 940, which is a current baseline value, at T_TEST on the time axis, a second baseline value (not shown), which is a temporary baseline value, is generated. Meanwhile, when the temporary compensation value 930 is added to a first threshold value 960, which is a current threshold value, a second threshold value (not shown), which is a temporary threshold value, may be generated.

Referring to FIGS. 8 and 9 together, it can be easily seen that when the temporary compensation value 930 is added to the first threshold value 960 at T_TEST, a result value will exceed a GRIP sensing count value. In this case, according to the related technology, although the grip/touch is not released, there is a high possibility of erroneously recognizing that the grip/touch is released. In contrast, in the present invention, the first threshold value 960 and the first baseline value 940 are maintained even at T_TEST by canceling the second baseline value and the second threshold value without adopting them.

Although according to an embodiment of the present invention, the second threshold value based on the second baseline value and the temporary compensation value 930 may be compared with the GRIP sensing count value, an equivalent effect may be obtained through an equivalent arithmetic operation and comparison in terms of a circuit configuration.

For example, as shown in FIG. 9, a CNT value may be obtained by subtracting the first threshold value 960 from the GRIP sensing count value at T_TEST. The processor according to an embodiment of the present invention may compare the CNT value and the temporary compensation value 930 with each other. When the temporary compensation value 930 exceeds the CNT value, the processor of the present invention maintains the first threshold value 960 and the first baseline value 940 even at T_TEST by canceling the second baseline value and the second threshold value without adopting them.

As shown in FIG. 9, the configuration of selecting the objects of the arithmetic operation and the comparison may be selected through a design change by those skilled in the art. Any modification made using any method will fall within the equivalent range of the present invention as long as the modification corresponds to a means for adding the temporary compensation value 930 to the first baseline value 940 at the present time and determining whether or not the second threshold value, which is a temporary threshold value, exceeds the GRIP sensing value as a derivative effect, which is the essential spirit of the present invention.

A second compensation scheme for compensating for a variation in temperature according to the present invention, which is shown in FIG. 9, is applied, an erroneous operation attributable to temperature variation-based over-compensation shown in FIG. 8 may be prevented, and undesired quick grip/touch release recognition attributable to the accumulation of sensor errors (over-compensation) may be prevented even when a grip/touch is used while being maintained for a long time.

Figure 10:
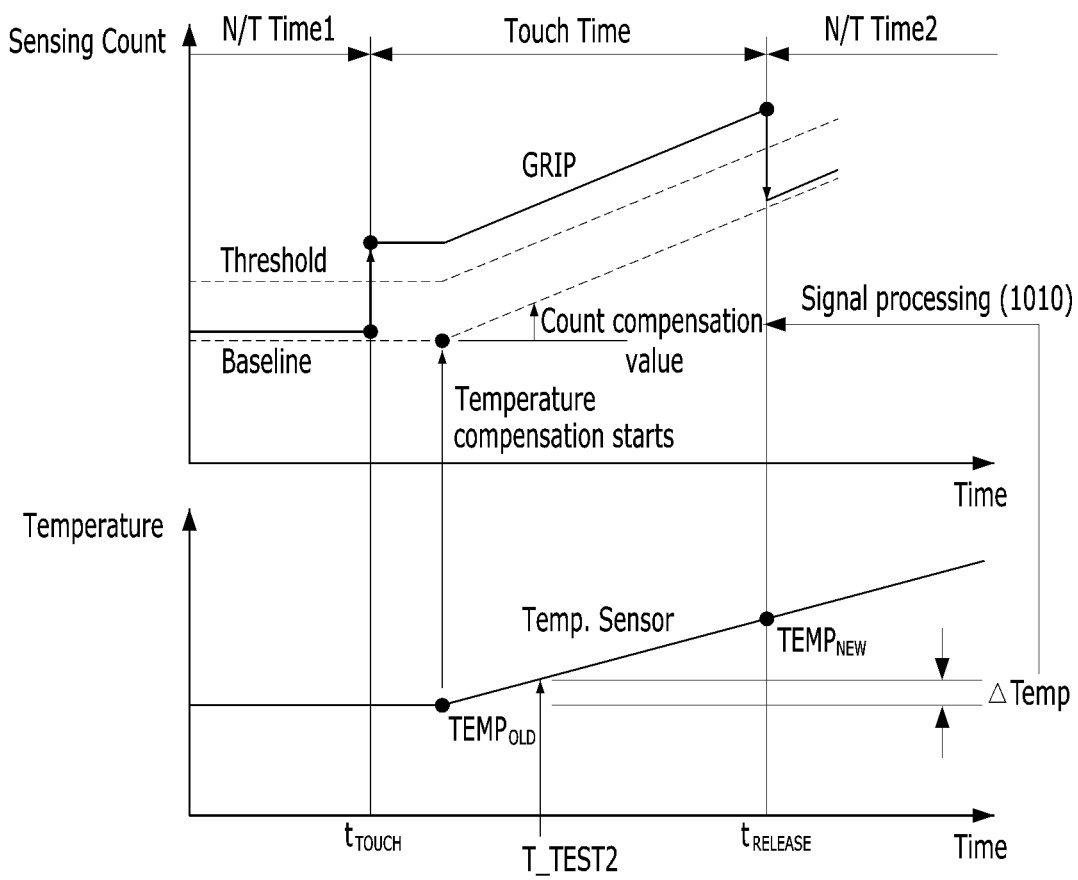
FIG. 10 is a view showing an operation of compensating the sensing count value of the baseline of a proximity sensor according to an embodiment of the present invention.

FIG. 10 is a view showing an operation of compensating the sensing count value of the baseline of a proximity sensor according to another embodiment of the present invention.

Referring to FIG. 10, it is assumed that interval Touch Time is a time interval in which a grip/touch is actually generated and maintained.

In connection with FIG. 10, the processor/signal processing circuit of the present invention derives a real-time temperature variation Temp based on a temperature sensor-measured value at determination time T_TEST2, and determines a count compensation value for a baseline value based on the real-time temperature variation Temp (see 1010). In this case, a temperature sensor mounted inside the IC chip may be used as the temperature sensor. Although a method of compensating a baseline value whenever a temperature variation reaches a constant level is used in FIGS. 4, 5, 8, and 9, a count compensation value for the baseline value and the threshold may be determined based on a real-time temperature at determination time T_TEST2 in FIG. 10 (see 1010). When a temperature variation is detected by the temperature sensor in the state in which a grip/touch has been recognized based on GRIP sensing value, the temperature compensation of a baseline value/threshold value based on the temperature variation is started. In FIG. 10, for ease of description, the time at which the temperature sensor starts to operate in the state in which a grip/touch has been recognized is indicated by $t_{TOUCH}$. In other words, a temperature compensation operation starts after $t_{TOUCH}$, and a count compensation value for the baseline value and the threshold value at determination time T_TEST2 is determined based on a real-time temperature variation Temp at determination time T_TEST2 (see 1010).

In the embodiment of FIG. 10, the first baseline value considered at determination time T_TEST2 is a baseline value at $t_{TOUCH}$, which is a temperature compensation start time, and a count compensation value is added to set a second baseline value (not shown), which is a temporary baseline value.

When a temporary baseline value and a temporary threshold value reflecting the count compensation value for the baseline value and the threshold value at determination point T_TEST2 exceed the GRIP sensing value, adjustment may be made to signal processing 1010.

The signal processing 1010 may be performed using a method of referring to a specific value based on a table, or may be performed by any formula. When the temporary baseline value and the temporary threshold value reflecting the count compensation value for the baseline value and the threshold value at determination time T_TEST2 exceed the GRIP sensing value, it is considered that temporary overcompensation has occurred. In the case of the table-based method, the signal processing 1010 may be adjusted by subtracting a predetermined value from the count compensation value of the table-based method. In contrast, in the case of the formula-based method, the signal processing 1010 may be adjusted by adjusting the coefficient or order of a formula or compensating for a negative offset.

The method of operating a circuit according to one embodiment of the present invention may be implemented in the form of program instructions, and may be then recorded in a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. These hardware devices may be configured to operate as one or more software modules in order to perform the operation of the present invention, and the vice versa.

However, the present invention is not limited to the embodiments. Like reference symbols in the drawings designate like components. The lengths, heights, sizes, widths, etc. introduced in the embodiments and drawings of the present invention may be exaggerated to help to understand.

Although the present invention has been described with reference to specific details, such as the specific components, and the limited embodiments and drawings, these are provided merely to help a general understanding of the present invention, and the present invention is not limited thereto. Furthermore, those having ordinary knowledge and/or skill in the technical field to which the present invention pertains may make various modifications and variations from the above detailed description.

Therefore, the spirit of the present invention should not be defined based only on the described embodiments, and not only the attached claims but also all equivalent to the claims should be construed as falling within the scope of the spirit of the present invention.

According to the present invention, there may be reduced electromagnetic waves generated in a device when temperature increases due to a long-time call during a call, particularly in the state in which the face of a user and the device are in close proximity to each other.

According to the present invention, an additive reference channel for the temperature compensation of the proximity sensor is not required, and thus the circuit is not complicated and the area and cost of component mounting may be reduced.

According to the present invention, rapid compensation may be performed through an adaptive temperature compensation process in response to the temperature variation state of the proximity sensor, and accuracy may be improved by reducing erroneous operations.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A proximity sensor for detecting proximity of a conductor to an electronic device, the proximity sensor comprising:
   a reception circuit configured to receive a first electrical signal which is generated based on proximity of the conductor;
   a first signal processing circuit configured to determine whether or not the conductor is in close proximity to the electronic device by using the first electrical signal, a first baseline value, and a threshold value;
   a temperature detection circuit configured to detect a temperature of the proximity sensor independently of the first electrical signal; and
   a second signal processing circuit configured to, when the conductor is in close proximity to the electronic device and also a temperature variation equal to or larger than a reference value is detected by the temperature detection circuit, generate a second baseline value by adding a temporary compensation value to the first baseline value.

2. The proximity sensor of claim 1, wherein:
   the second signal processing circuit is further configured to provide the second baseline value to the first signal processing circuit; and
   the first signal processing circuit is further configured to select a baseline value, to be used to determine whether or not the conductor is in close proximity to the electronic device, based on the second baseline value and the first electrical signal.

3. The proximity sensor of claim 2, wherein the first signal processing circuit further configured to, when the second baseline value or a second threshold value based on the second baseline value is larger than the first electrical signal, determine whether or not the conductor is in close proximity to the electronic device by using the first baseline value.

4. The proximity sensor of claim 2, wherein the first signal processing circuit further configured to, when the second baseline value or a second threshold value based on the second baseline value is not larger than the first electrical signal, determine whether or not the conductor is in close proximity to the electronic device by using the second baseline value and update the first baseline value by using the second baseline value.

5. The proximity sensor of claim 2, wherein:
the first signal processing circuit is further configured to provide the selected baseline value, to be used to determine whether or not the conductor is in close proximity to the electronic device, to the second signal processing circuit; and
the second signal processing circuit is further configured to update the first baseline value by using the provided baseline value.

6. A proximity detection method for a proximity sensor for detecting proximity of a conductor to an electronic device, the proximity detection method comprising:
receiving a first electrical signal which is generated based on proximity of the conductor;
detecting a temperature of the proximity sensor independently of the first electrical signal;
determining whether or not the conductor is in close proximity to the electronic device by using the first electrical signal, a first baseline value, and a threshold value; and
when the conductor is in close proximity to the electronic device and also a temperature variation equal to or larger than a reference value is detected, generating a second baseline value by adding a temporary compensation value to the first baseline value.

7. The proximity detection method of claim 6, further comprising, when the conductor is in close proximity to the electronic device and also the temperature variation equal to or larger than the reference value is detected, selecting a baseline value, to be used to determine whether or not the conductor is in close proximity to the electronic device, based on the second baseline value and the first electrical signal.

8. The proximity detection method of claim 7, wherein the selecting comprises, when the second baseline value or a second threshold value based on the second baseline value is larger than the first electrical signal, selecting the first baseline value as the baseline value to be used to determine whether or not the conductor is in close proximity to the electronic device.

9. The proximity detection method of claim 7, wherein the selecting comprises, when the second baseline value or a second threshold value based on the second baseline value is not larger than the first electrical signal, selecting the second baseline value as the baseline value to be used to determine whether or not the conductor is in close proximity to the electronic device.

10. The proximity detection method of claim 7, further comprising updating the first baseline by using the selected baseline value to be used to determine whether or not the conductor is in close proximity to the electronic device.

\* \* \* \* \*